United States Patent
Hwang

(10) Patent No.: US 12,379,842 B2
(45) Date of Patent: Aug. 5, 2025

(54) STORAGE DEVICE OPERATING ON ZONE BASIS AND DATA PROCESSING SYSTEM INCLUDING THE SAME

(71) Applicant: SAMSUNG ELECTRONICS CO., LTD., Suwon-si (KR)

(72) Inventor: Joo Young Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 18/324,581

(22) Filed: May 26, 2023

(65) Prior Publication Data

US 2024/0118805 A1 Apr. 11, 2024

(30) Foreign Application Priority Data

Oct. 7, 2022 (KR) .................. 10-2022-0128858

(51) Int. Cl.
   *G06F 3/06* (2006.01)
   *G06F 12/02* (2006.01)
   *G06F 16/174* (2019.01)

(52) U.S. Cl.
   CPC ............ *G06F 3/0608* (2013.01); *G06F 3/064* (2013.01); *G06F 3/0688* (2013.01); *G06F 12/0246* (2013.01); *G06F 16/1744* (2019.01); *G06F 2212/7201* (2013.01)

(58) Field of Classification Search
   None
   See application file for complete search history.

(56) References Cited

U.S. PATENT DOCUMENTS

| | | | |
|---|---|---|---|
| 9,418,021 B2 | 8/2016 | Gupta | |
| 10,942,808 B2 | 3/2021 | Pletka et al. | |
| 11,204,716 B2 | 12/2021 | Glimcher et al. | |
| 2012/0096217 A1* | 4/2012 | Son | G06F 12/0246 711/E12.008 |
| 2014/0281167 A1* | 9/2014 | Danilak | G06F 12/0246 711/103 |
| 2017/0147598 A1* | 5/2017 | Sawada | G06F 3/0641 |
| 2019/0310913 A1* | 10/2019 | Helmick | G06F 3/0619 |
| 2020/0034229 A1* | 1/2020 | Schneider | G06F 3/0689 |
| 2020/0159621 A1* | 5/2020 | Velayuthaperumal | G06F 3/064 |

(Continued)

FOREIGN PATENT DOCUMENTS

KR   10-2019-0076589   7/2019

*Primary Examiner* — Kaushikkumar M Patel
(74) *Attorney, Agent, or Firm* — MORGAN, LEWIS & BOCKIUS LLP

(57) ABSTRACT

A data processing system includes a host including a host memory storing file systems, each file system including file pages, and storage devices. Each storage device includes a memory device including memory blocks, and a memory controller dividing the memory blocks into superblocks, and controlling a memory operation of the memory device based on a result of dividing the memory blocks. The host requests a first storage device of the storage devices to write a first file page of a first file system of the file systems to a first memory block of the first storage device, and requests a second storage device of the storage devices to write a second file page of the first file system of the file systems to a first memory block of the second storage device. The first file system is configured in a RAID manner using at least some of the storage devices.

20 Claims, 15 Drawing Sheets

(56) References Cited

U.S. PATENT DOCUMENTS

| | | |
|---|---|---|
| 2021/0133029 A1 | 5/2021 | Dong et al. |
| 2022/0043709 A1 | 2/2022 | O'Rourke et al. |
| 2022/0229722 A1* | 7/2022 | Karkra .................. G06F 3/0634 |
| 2022/0244869 A1* | 8/2022 | Kanteti ................. G06F 3/0631 |

* cited by examiner

FIG. 3

Compression Header(TB31)

| Zone index |
|---|
| Chunk number |
| Page index |
| Chunk size |
| Compression algorithm |
| Header checksum |
| ⋮ |

FIG. 10

| # of Chunk (for SB#j @100-i+2) | Chunk Offset |
|---|---|
| 0 | |
| ... | |
| m | Off_m |
| ... | |

TB22-2

STORAGE DEVICE OPERATING ON ZONE BASIS AND DATA PROCESSING SYSTEM INCLUDING THE SAME

CROSS-REFERENCE TO RELATED APPLICATION

This application claims priority under 35 U.S.C. § 119 to Korean Patent Application No. 10-2022-0128858, filed on Oct. 7, 2022 in the Korean Intellectual Property Office, the disclosure of which is incorporated by reference herein in its entirety.

TECHNICAL FIELD

Embodiments of the present disclosure relate to a storage device and a data processing system, and more particularly, to a storage device supporting a zoned named space interface and a data processing system including the same.

Discussion of Related Art

A storage device may refer to a memory system that stores data therein based on a request from a host, such as, for example, a mobile terminal such as a computer, a smartphone, a tablet, or various other electronic devices. The storage device may include, for example, a hard disk drive, a solid state drive, a universal flash storage (UFS) device, an embedded multimedia card (eMMC), and the like.

As advances are made in data processing technology, a host may process vast amounts of data at a high speed. In addition, as advances are made in memory integration technology, a storage device may also store a large amount of data received from the host. Further, a storage device may compress data received from a host by itself in order to increase memory usage efficiency and store the compressed data therein, and may decompress the compressed data and transmit the decompressed data to the host.

SUMMARY

Embodiments of the present disclosure provide a data processing system that efficiently implements Redundant Arrays of Inexpensive Disks (RAID) on storage devices including an In Storage Compression (ICS) function.

According to an embodiment of the present disclosure, a data processing system includes a host including a host memory configured to store a plurality of file systems, in which each file system includes a plurality of file pages, and a plurality of storage devices. Each of the storage devices includes a memory device including a plurality of memory blocks, and a memory controller configured to divide the plurality of memory blocks into a plurality of superblocks, and control a memory operation of the memory device based on a result of dividing the plurality of memory blocks. The host requests a first storage device of the plurality of storage devices to write a first file page of a first file system of the plurality of file systems to a first memory block of the first storage device, and the host requests a second storage device of the plurality of storage devices to write a second file page of the first file system of the plurality of file systems to a first memory block of the second storage device. The first file system is configured in a Redundant Arrays of Inexpensive Disks (RAID) manner using at least some of the plurality of storage devices.

According to an embodiment of the present disclosure, a data processing system includes a host including a host memory configured to store a plurality of file systems, in which each file system includes a plurality of file pages, and a plurality of storage devices. Each of the storage devices includes a memory device including a plurality of memory blocks, and a memory controller configured to divide the plurality of memory blocks into a plurality of superblocks, and control a memory operation of the memory device based on a result of dividing the plurality of memory blocks. A first file page of a first file system of the plurality of file systems is written to a first memory block of a first storage device of the plurality of storage devices. A second file page of the first file system of the plurality of file systems is written to a first memory block of a second storage device of the plurality of storage devices. The first file system is configured in a Redundant Arrays of Inexpensive Disks (RAID) manner using at least some of the plurality of storage devices. When the host reads the first file page, the host requests a logical address of the first memory block from the first storage device, receives the logical address from the first storage device, and reads the first file page based on the received logical address.

According to an embodiment of the present disclosure, a data processing system includes a host including a host memory configured to store a plurality of file systems, in which each file system includes a plurality of file pages, and a plurality of storage devices. Each of the storage devices includes a memory device including a plurality of memory blocks, and a memory controller configured to divide the plurality of memory blocks into a plurality of superblocks, and control a memory operation of the memory device based on a result of dividing the plurality of memory blocks. The memory controller is configured to compress and decompress data. Each of the plurality of storage devices is configured to receive compressed data stored in another storage device of the plurality of storage devices, and to decompress the received compressed data.

BRIEF DESCRIPTION OF THE DRAWINGS

The above and other aspects and features of the present disclosure will become more apparent by describing in detail embodiments thereof with reference to the accompanying drawings, in which:

FIG. 3 is an example of a table illustrating information included in a compression header according to some embodiments.

FIG. 10 is a table illustrating a chunk mapping table that is updated via a data recovery operation of a data processing system according to some embodiments.

DETAILED DESCRIPTION OF THE EMBODIMENTS

Figure 1:
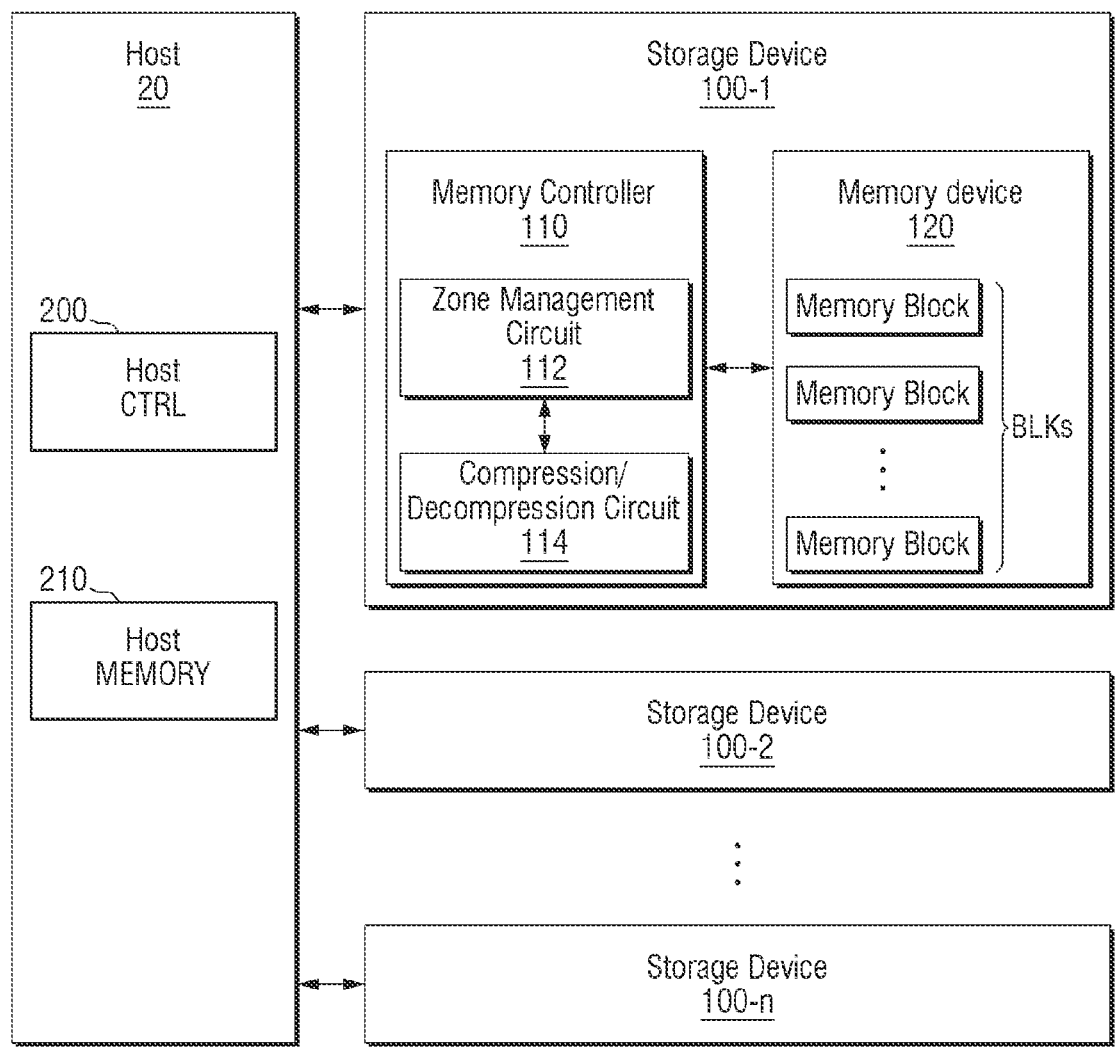
FIG. 1 is a block diagram illustrating a data processing system according to some embodiments.

Embodiments of the present disclosure will be described more fully hereinafter with reference to the accompanying drawings. Like reference numerals may refer to like elements throughout the accompanying drawings.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify an entirety of the list of elements and may not modify the individual elements of the list. When referring to "C to D", this means C inclusive to D unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers, unless the context indicates otherwise. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is referred to as being disposed "on" or "on a top" of another layer, film, region, plate, or the like, the former may directly contact the latter or still another layer, film, region, plate, or the like may be disposed between the former and the latter, unless the context indicates otherwise. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is referred to as being disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In an example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other, and may be technically associated with each other or operate with each other. The embodiments may be implemented independently of each other and may be implemented together in an association relationship. Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

Figure 2A:
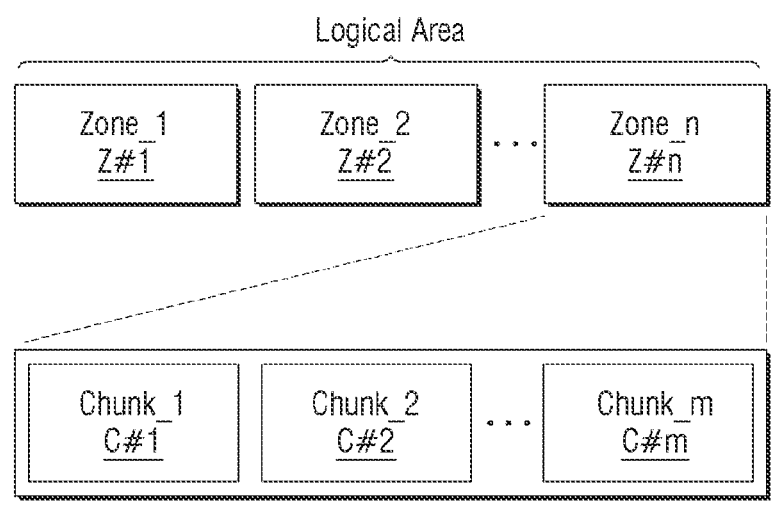
FIGS. 2a and 2b are diagrams illustrating a logical area and a physical area related to a memory operation of a storage device according to some embodiments.
Figure 2B:
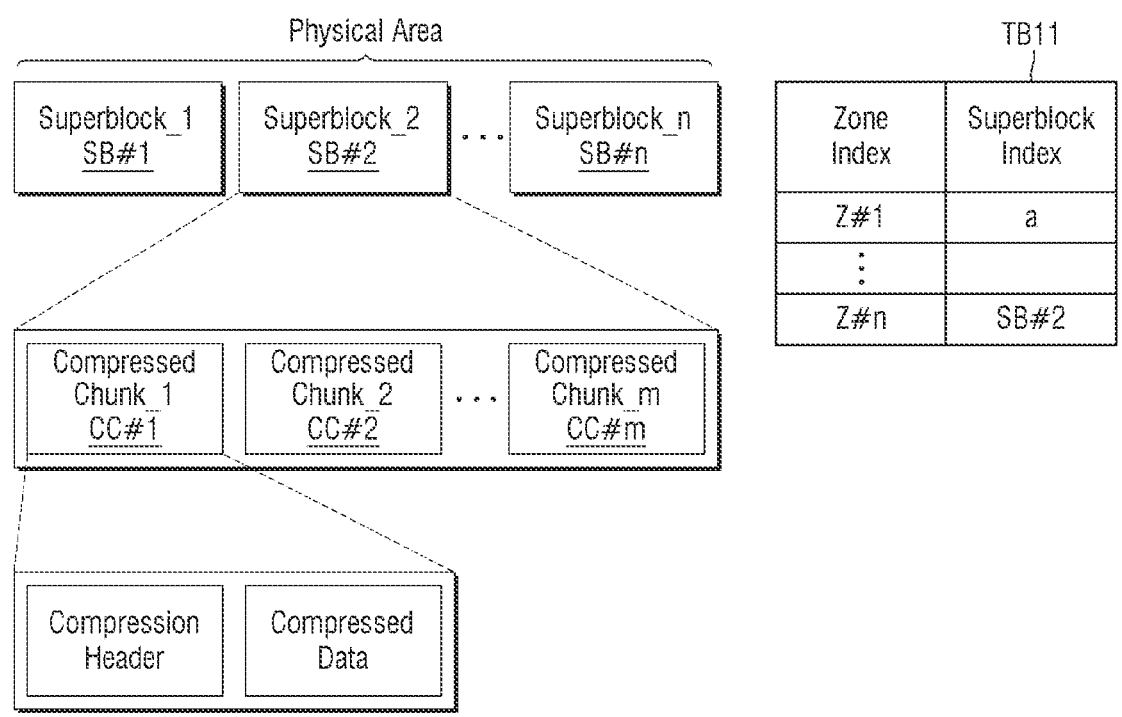
Figure 4:
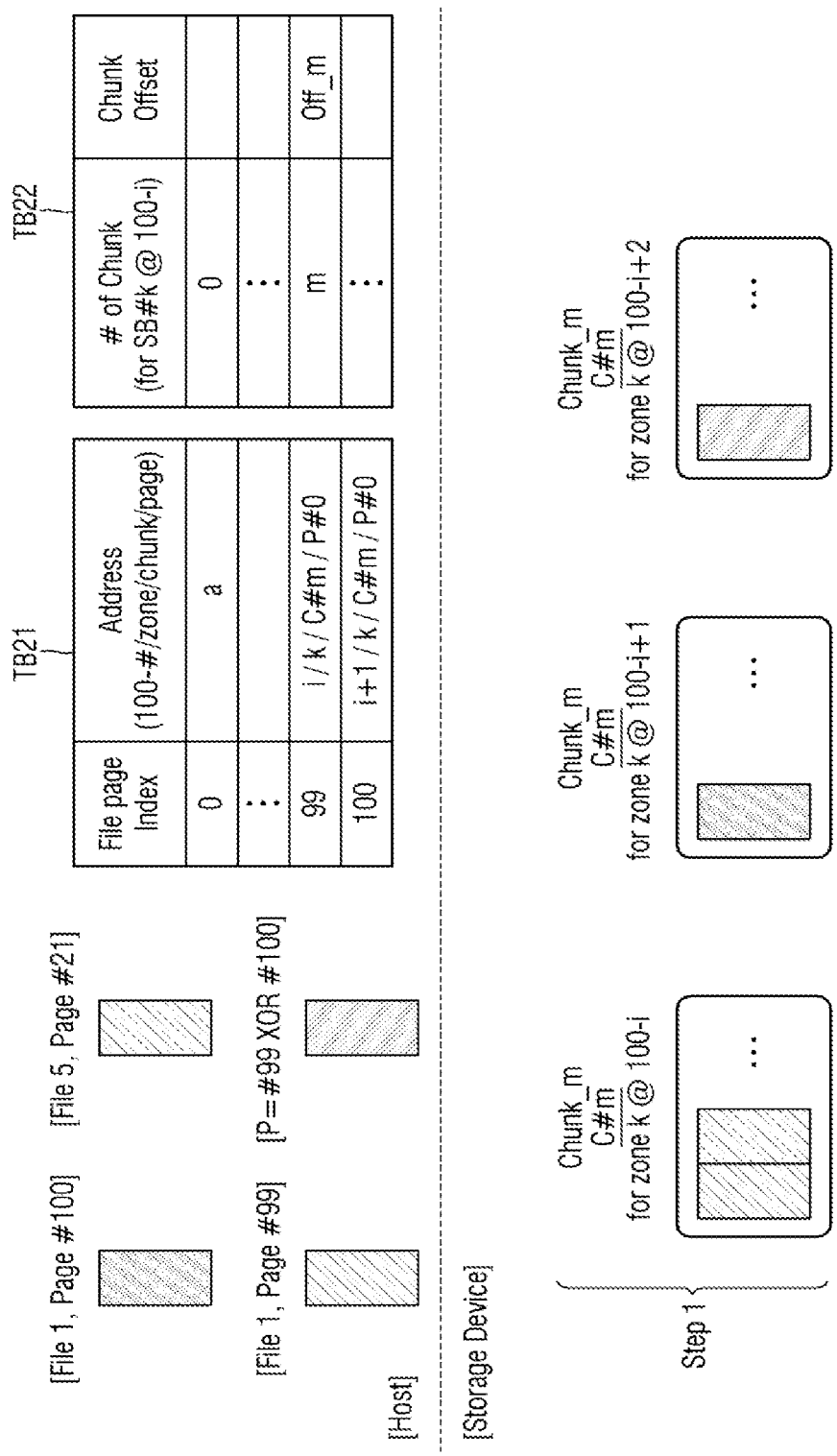
FIGS. 4 and 5 are diagrams illustrating an operation of the data processing system according to some embodiments.
Figure 5:
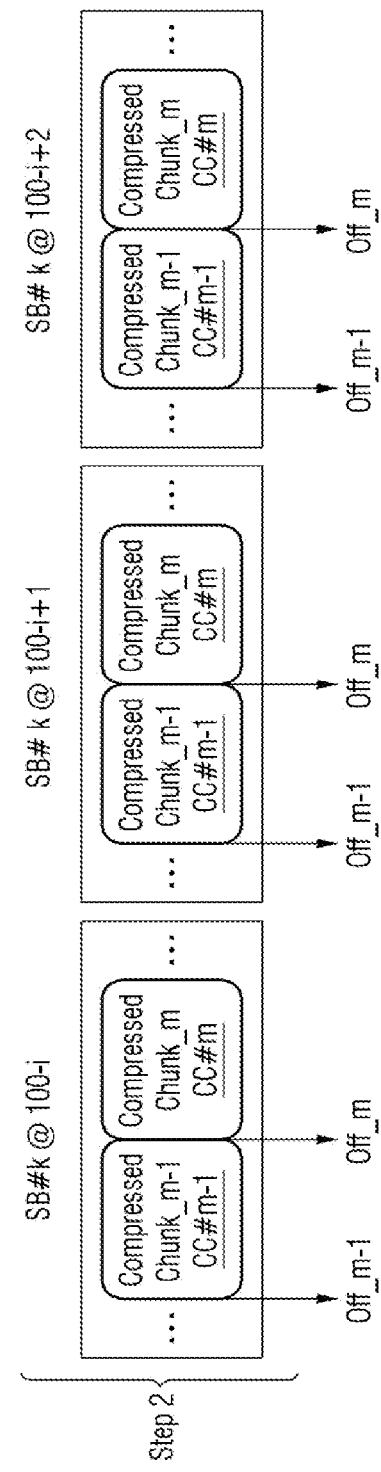

FIG. 1 is a block diagram illustrating a data processing system according to some embodiments. FIGS. 2a and 2b are diagrams illustrating a logical area and a physical area related to a memory operation of a storage device. FIG. 3 is an example of a table illustrating information included in a compression header. FIGS. 4 and 5 are diagrams illustrating an operation of the data processing system according to some embodiments.

Referring to FIG. 1, a data processing system 10 may include a host 20 and a plurality of storage devices 100-1 to 100-n (n is a positive integer). The host 20 refers to a device that processes data and may be any one of a central processing unit (CPU), a graphic processing unit (GPU), a neural processing unit (NPU), and the like. As used herein, the host 20 may be referred to as a host processor or a host device.

Hereinafter, descriptions about a first storage device 100-1 among a plurality of storage devices 100-1 to 100-$n$ (n is a positive integer) may be applied to the remaining storage devices 100-2 to 100-$n$.

The host 20 may communicate with the storage device (for example, the first storage device 100-1) in order to write data generated while performing a data processing operation to the storage device (for example, the first storage device 100-1), or read data utilized for the processing operation from the storage device (for example, the first storage device 100-1).

The host 20 may communicate with the storage device (for example, the first storage device 100-1) using at least one of various communication schemes such as, for example, universal serial bus (USB), serial at attachment (SATA), small computer system interface (SCSI), serial attached SCSI (SAS), high speed interchip (HSIC), peripheral component interconnection (PCI), PCI express (PCIe), non-volatile memory express (NVMe), etc.

The host 20 includes a host controller 200 and a host memory 210.

The host controller 200 may manage an operation of storing data (for example, write target data) of a buffer area of the host memory 210 in the memory device 120, or storing data (for example, read data) of the memory device 120 in the buffer area.

The host memory 210 may function as a buffer memory for temporarily storing therein data to be transmitted to the storage device (for example, the first storage device 100-1), or data transmitted from the storage device (for example, the first storage device 100-1).

According to an embodiment, the host controller 200 and the host memory 210 may be implemented as separate semiconductor chips. Alternatively, in some embodiments, the host controller 200 and the host memory 210 may be integrated into the same semiconductor chip. In an example, the host controller 200 may be one of a plurality of modules included in an application processor, and the application processor may be implemented as a system-on-chip (SoC). Further, the host memory 210 may be an embedded memory provided in the application processor or a non-volatile memory or a memory module disposed external to the application processor.

The first storage device 100-1 may include a memory controller 110 and a memory device 120. The memory controller 110 may control a memory operation and a background operation of the memory device 120. In an example, the memory operation may include a write operation (or a program operation), a read operation, and an erase operation. In an example, the background operation may include at least one of a garbage collection operation, a wear leveling operation, a bad block management operation, and the like.

In some embodiments, the memory device 120 may be implemented in various types such as, for example, a NAND flash memory, NOR flash memory, resistive random access memory (resistive RAM), phase-change memory (RRAM), magneto resistive random access memory (MRAM), ferro-electric random access memory (FRAM), or spin transfer torque random access memory (STT-RAM). Hereinafter, embodiments of the present disclosure will be described based on an example in which the memory device 120 is implemented as the NAND flash memory.

In some embodiments, the memory controller 110 may include a zone management circuit 112 and a compression/decompression circuit 114. FIG. 1 illustrates that the memory controller 110 includes the zone management circuit 112 and the compression/decompression circuit 114 in order to emphasize a characteristic operation of the memory controller 110. However, this is only an example. In an example, the memory controller 110 itself may perform an operation of each of the zone management circuit 112 and the compression/decompression circuit 114. In an example, each of the zone management circuit 112 and the compression/decompression circuit 114 may be implemented as hardware logic or may be implemented as software logic and executed by the memory controller 110.

The zone management circuit 112 may support a zoned name space scheme such that the host 20 may use a plurality of memory blocks BLKs on a zone basis. As used herein, a named space refers to a logical area (or a logical block) and means a size of a non-volatile memory that may be formatted at one time. Based on the zoned name space scheme, the first storage device 100-1 may perform a sequential write operation on each of a plurality of zones in response to a request from the host 20. In an example, when the host 20 executes a first application program, data for the first application may be written to a first zone assigned to the first application program. Thus, attributes of data written in the first zone may be similar to each other. Further, logical addresses of logical pages included in one zone may be continuous, and the zone management circuit 112 may write data to the logical pages sequentially.

Referring to FIG. 2a, the logical area may include first to n-th (n is a positive integer) zone Z #1 to Z #n. The host 20 may recognize a plurality of memory blocks BLKs of the memory device 120 as the first to n-th zones Z #1 to Z #n and may request a memory operation to the first storage device 100-1. Each of the first to n-th zones Z #1 to Z #n may include a plurality of logical pages, and sizes of the first to n-th zones Z #1 to Z #n may be equal to each other. Further, the application program executed by the host 20 may correspond to at least one zone. First to m-th (m is a positive integer) chunks C #1 to C #m may be written virtually to the n-th zone Z #n. The first to m-th chunks C #1 to C #m may have sequential logical addresses based on indexes. Therefore, data may be written sequentially to the first to m-th chunks C #1 to C #m in a direction from a low index to a high index. In accordance with some embodiments of the present disclosure, the virtual write operation may be a write operation recognized by the host. In this regard, the host may recognize that data which the host has requested to write to the first storage device 100-1 is written while being included in a specific chunk of a specific zone. The first storage device 100-1 may compress the first to m-th chunks C #1 to C #m and write the compressed chunks to the plurality of memory blocks BLKs. In an example, as used herein, the chunk may be defined as a data set written to a preset number of logical pages or a data unit including a preset number of logical pages. Sizes of the first to m-th chunks C #1 to C #m may be equal to each other. An embodiment of the n-th zone Z #n may also be applied to each of the first to (n−1)-th zone Z #1 to Z #n−1.

Referring to FIG. 2b, the physical area may include first to n-th superblocks SB #1 to SB #n. Each of the first to n-th superblocks SB #1 to SB #n may include a plurality of physical pages, and sizes of the first to n-th superblocks SB #1 to SB #n may be equal to each other. The plurality of memory blocks BLKs of the memory device 120 may be divided into the first to n-th superblocks SB #1 to SB #n. In an example, one superblock may include at least one memory block. The first to n-th superblocks SB #1 to SB #n may correspond, in a one-to-one manner, to the first to n-th zones Z #1 to Z #n. The zone management circuit 112 may be configured to manage a zone mapping table TB11 indicating a mapping relationship between the first to n-th zones Z #1 to Z #n as the logical area, and the first to n-th superblocks SB #1 to SB #n as the physical area. In an example, as in the zone mapping table TB11, the n-th zone Z #n may be mapped to a second superblock SB #2. In an example, as the first storage device 100-1 performs a memory operation, the n-th zone Z #n may be mapped to a superblock other than the second superblock SB #2, and the zone management circuit 112 may update the zone mapping table TB11 based on a changed mapping relationship. In some embodiments, instead of the zone mapping table TB11, a fixed mapping relationship between the first to n-th zones Z #1 to Z #n and the first to n-th superblocks SB #1 to SB #n may be defined in the first storage device 100-1. In this case, the zone mapping table TB11 may be omitted.

In some embodiments, first to m-th compressed chunks CC #1 to CC #m may be written to the second superblock SB #2. The first to m-th compressed chunks CC #1 to CC #m may have sequential physical addresses based on indexes. Therefore, the first to m-th compressed chunks CC #1 to CC #m may be written sequentially in a direction from a low index to a high index. The compression/decompression circuit 114 may compress the first to m-th chunks C #1 to C #m of the n-th zone Z #n to generate the first to m-th compressed chunks CC #1 to CC #m and, and may write the generated first to m-th compressed chunks CC #1 to CC #m to the second superblock SB #2. In some embodiments, the first to m-th compressed chunks CC #1 to CC #m may be based on at least one of a plurality of compression algorithms. Sizes of the first to m-th compressed chunks CC #1 to CC #m may be the same as or different from each other. In an example, a size of a first compressed chunk CC #1 based on a first compression algorithm may be different from a size of a second compressed chunk CC #2 based on a second compression algorithm. In an example, the first compressed chunk CC #1 and the second compressed chunk CC #2 based on the same algorithm may have the same size.

In some embodiments, the first compressed chunk CC #1 may include a compression header and compressed data.

Referring to FIGS. 2b and 3, in an example, a compression header TB31 may include at least one of a compression algorithm of the first compressed chunk CC #1, a size of the first compressed chunk CC #1, a zone index corresponding to a superblock to which the first compressed chunk CC #1 is written, a chunk number before the first compressed chunk CC #1 is compressed (for example, the first chunk CC #1), a page index in a zone to which the chunk number before the first compressed chunk CC #1 is compressed (for example, the first chunk CC #1) is written, and the number of logical pages included in the first chunk (C #1 in FIG. 2a) corresponding to the first compressed chunk CC #1.

Referring back to FIG. 2b, the compressed data may be obtained by compressing the first chunk (C #1 in FIG. 2a). In some embodiments, the compression/decompression circuit 114 may first read the compression header and perform a decompression operation on the compressed data based on the read compression header. An example of a configuration of the first compressed chunk CC #1 may also be applied to each of the second to m-th compressed chunks CC #2 to CC #m, and embodiments of the second superblock SB #2 may also be applied to each of the first and third to n-th superblock SB #1, and SB #3 to SB #n.

Referring back to FIG. 1, in some embodiments, the zone management circuit 112 may generate position-related offsets of compressed chunks in superblocks.

This is described further below with reference to FIGS. 1 and 4.

In an example, the zone management circuit 112 may update a compressed chunk mapping table TB22 based on the generated position-related offsets of the compressed chunks. In an example, the zone management circuit 112 may transmit, to the host 20, the compressed chunk mapping table TB22 in which address information including the generated position-related offsets of the compressed chunks are recorded.

For example, the zone management circuit 112 of the i-th storage device (i is a positive integer) may send the compressed chunk mapping table TB22 to the host 20 when a space into which a page is to be written is absent in a k-th zone zone_k (k is a positive integer) (in other words, the zone is closed).

Upon receiving the compressed chunk mapping table TB22, the host 20 may store the compressed chunk mapping table TB22, for example, in the host memory 210. Thereafter, when the host 20 wants to read a page written to the i-th storage device (i is a positive integer), the host may refer to the compressed chunk mapping table TB22 by itself and may request the read thereof to the i-th storage device (i is a positive integer).

Thus, the i-th storage device (i is a positive integer) does not separately store therein the compressed chunk mapping table TB22. Thus, a storage space of the i-th storage device (i is a positive integer) may be more efficiently utilized.

The descriptions based on the i-th storage device (i is a positive integer) as set forth above may be applied to each of other storage devices connected to the host (20 in FIG. 1) (e.g., storage devices other than the i-th storage device among the first storage device 100-1 to the n-th storage device 100-n).

Hereinafter, an operation in which the data processing system 10 according to some embodiments efficiently implements Redundant Arrays of Inexpensive Disks (RAID) on the storage devices 100-1 to 100-n including the In Storage Compression (ICS) function will be described.

Referring to FIGS. 1 and 4, while the host 20 executes a predetermined application program to perform data processing operation, the host may store a 100th file page #100 of a first file File 1, a 21th file page #21 of a fifth file File 5 and a 99th file page #99 of the first file File 1.

However, the present disclosure is not limited thereto. For example, according to some embodiments, the host 20 may store a parity file or data P generated by XORing the 99th file page #99 of the first file File 1 and the 100th file page #100 of the first file File 1.

As used herein, a file page may refer to data of a page unit used or processed by the host. As used herein, a page may refer to a memory space of a page unit included in a chunk or a compressed chunk.

The host 20 may send the 100th file page #100 of the first file File 1, the 21th file page #21 of the 5th file File 5, the parity file P, and the 99th file page #99 of the first file File 1, and a write request and a logical address to at least some of the plurality of storage devices (for example, the i-th storage device 100-i, the (i+1)-th storage device 100-i+1, and the (i+2)-th storage device 100-i+2).

A write request of the data processing system 10 according to some embodiments may be referred to as a named write request.

In some embodiments, the host 20 may request a read operation to be performed on at least some of the plurality of storage devices (for example, the i-th storage device 100-i, the (i+1)-th storage device 100-i+1, and the (i+2)-th storage device 100-i+2) based on the first file mapping table TB21 in which meta data for the first file system File 1 is written.

The first file mapping table TB21 may indicate a mapping relationship between indexes File page Index of file pages of the first file system File 1 and logical addresses in which a plurality of file pages are written.

Not only the first file mapping table TB21, but also an n-th file mapping table in which information about indexes of file pages of an n-th file system File n (n is a positive integer greater than 1), for example, a fifth file system File 5 are stored, may be present.

In some embodiments of the present disclosure, data being written to a specific address may be interpreted as data being written to a memory area indicated by the specific address. An entry of the logical address may include, for example, an index, a zone index, a chunk index and a page index of a storage device in which a plurality of file pages constituting the first file system File 1 are stored.

The page index is used to identify the pages included in a corresponding chunk. For example, the first file mapping table TB21 has a logical address indicating that the 99th file page #99 is written to a 0-th page P #0 of an m-th chunk C #m of a k-th zone zone_k of the i-th storage device 100-i. Further, the first file mapping table TB21 has a logical address indicating that the 100th file page #100 is written to a 0-th page P #0 of an m-th chunk C #m of a k-th zone zone_k of the (i+1)-th storage device 100-i+1.

For example, the host 20 of the data processing system 10 according to some embodiments may request the i-th storage device 100-i among the plurality of storage devices 100-1 to 100-n to write the 99th file page Page #99 of the first file system File 1 among the plurality of file systems to a k-th memory block (for example, a k-th zone) of the i-th storage device 100-i.

Further, the host 20 of the data processing system 10 according to some embodiments may request the (i+1)-th storage device 100-i+1 among the plurality of storage devices 100-1 to 100-n to write the 100th file page Page #100 of the first file system File 1 among the plurality of file systems to a k-th memory block (e.g., a k-th zone) of the (i+1)-th storage device 100-i+1.

Using a first step Step 1 as described above, the data processing system 10 according to some embodiments may operate such that the first file system File 1 is configured in the Redundant Arrays of Inexpensive Disks (RAID) manner using at least some of the plurality of storage devices 100-1 to 100-n (for example, the i-th storage device 100-i and the (i+1)-th storage device 100-i+1).

In addition, the host 20 of the data processing system 10 according to some embodiments may request the (i+2)-th storage device 100-i+2 among the plurality of storage devices 100-1 to 100-n to write the parity data P of the first file system File 1 of the plurality of file systems to a k-th memory block (e.g., a k-th zone) of (i+2)-th storage device 100-i+2.

For reference, the parity bit P may be a parity bit obtained by XORing the 99th file page Page #99 and the 100th file page Page #100. However, a method of generating the parity bit P is not limited thereto.

Using the first step Step 1 as described above, the data processing system 10 according to some embodiments may operate such that the first file system File 1 is configured in the Redundant Arrays of Inexpensive Disks (RAID) manner using at least some of the plurality of storage devices 100-1 to 100-n of (for example, the i-th storage device 100-i, the (i+1)-th storage device 100-i+1, and the (i+2)-th storage device 100-i+2).

Hereinafter, with reference to FIGS. 1, 4, and 5, an operation in which the data processing system 10 according to some embodiments manages the compressed chunk generated by compressing the chunk will be described in detail.

Referring to FIGS. 1, 4, and 5, in some embodiments, at least some of the plurality of storage devices 100-1 to 100-n may sequentially write the 99th file page #99, the 100th file page #100 and the parity data to an m-th chunk C #m of the k-th zone zone_k as the logical area in response to the write request from the host 20.

The i-th storage device 100-i may compress the m-th chunk C #m to create an m-th compressed chunk CC #m, and may write the m-th compressed chunk CC #m to a k-th superblock SB #k mapped to k-th zone zone_k by referring to the chunk mapping table TB22.

In some embodiments, the i-th storage device 100-i may generate a position-related m-th offset Off_m of the m-th compressed chunk CC #m in the k-th superblock SB #k, and may update the chunk mapping table TB22 based on the m-th offset Off_m.

The i-th storage device 100-i may use the chunk mapping table TB22 to convert a logical address into a physical address. In some embodiments, the chunk mapping table TB22 may indicate a mapping relationship between indices of superblocks, indices of compressed chunks, and position-related offsets of the compressed chunks.

In an example, referring to the chunk mapping table TB22 for the i-th storage device 100-i, the m-th compressed chunk CC #k of the k-th superblock SB #k may be mapped with the m-th offset Off_m. Further, an (m−1)-th compressed chunk CC #m−1 of the k-th superblock SB #k written before the m-th compressed chunk CC #m may be mapped with an (m−1)-th offset Off_m−1.

In some embodiments, the (m−1)-th offset Off_m−1 may indicate a starting physical address in the k-th superblock SB #k of the (m−1)-th compressed chunk CC #m−1. The m-th offset Off_m may indicate a starting physical address in the k-th superblock SB #k of the m-th compressed chunk CC #m. The i-th storage device 100-i may find the (m−1)-th compressed chunk CC #m−1 and the m-th compressed chunk CC #m based on a relationship between the (m−1)-th compressed chunk CC #m−1 and the m-th compressed chunk CC #m sequentially written in the k-th superblock SB #k, the (m−1)-th offset Off_m−1, and the m-th offset Off_m. In this manner, the i-th storage device 100-i may find other compressed chunks in the k-th superblock SB #k, and, furthermore, compressed chunks of other superblocks. Further, in this manner, each of other storage devices (for example, the (i+1)-th storage device 100-i+1, and the (i+2)-th storage device 100-i+2) may find other compressed chunks in the k-th superblock SB #k in each of the devices, and furthermore, compressed chunks of other superblocks therein.

In some embodiments, the i-th storage device 100-i may compress the received chunk in response to the write request from the host 20 to generate the compressed chunk, and then may write the compressed chunk to the superblock, and may identify the position-related offset of the compressed chunk to update the chunk mapping table TB22. The i-th storage device 100-i may convert a received logical address into a physical address based on the chunk mapping table TB22 in response to the read request from the host 20. The i-th storage device 100-$i$ may perform a read operation using the physical address. The descriptions based on the i-th storage device 100-$i$ may be applied to each of other storage devices (for example, the (i+1)-th storage device 100-$i$+1, and the (i+2)-th storage device 100-$i$+2).

In some embodiments, the compressed chunks are generated via compression of the chunks. Unlike chunks composed of logical pages, the compressed chunk may not be in a page aligned state, but rather, may be in a byte aligned state. Thus, position-related offsets of the compressed chunks may correspond to byte-aligned offsets. In some embodiments, each of the position-related offsets of the compressed chunks may include a starting physical address of each of the compressed chunks in the superblocks in which the compressed chunks are respectively included.

The data processing system 10 according to some embodiments may perform a second step Step 2 as described above such that the compressed chunks are configured in the Redundant Arrays of Inexpensive Disks (RAID) manner using at least some of the plurality of storage devices 100-1 to 100-$n$ (for example, the i-th storage device 100-$i$, the (i+1)-th storage device 100-$i$+1, and the (i+2)-th storage device 100-$i$+2).

Figure 6:
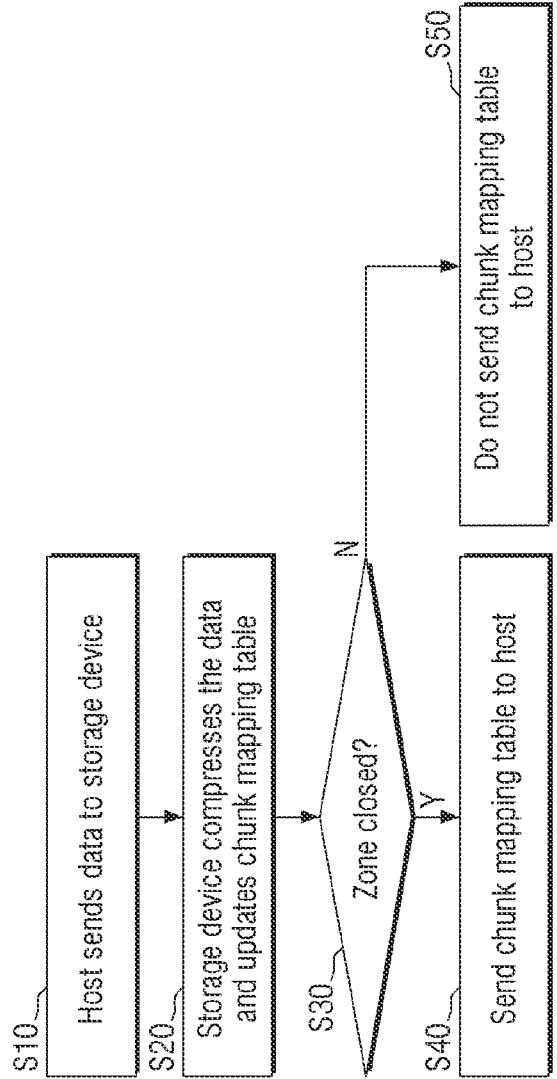
FIG. 6 is a flowchart illustrating a write operation of a data processing system according to some embodiments.

FIG. 6 is a flowchart illustrating a write operation of a data processing system according to some embodiments.

Hereinafter, for convenience of explanation, a further description of components and technical aspects previously described with reference to FIGS. 1 to 5 may be omitted.

Referring to FIGS. 1, 4, 5, and 6, while the host 20 executes a predetermined application program to perform a data processing operation, the host 20 may store the 99th file page #99 of the first file File 1 and the 100th file page #100 of the first file File 1.

However, the present disclosure is not limited thereto. The host 20 may also store the parity file or data P generated by XORing the 99th file page #99 of the first file File 1 and the 100th file page #100 of the first file File 1.

The host 20 transmits the 100th file page #100 of the first file File 1, the parity file P and the 99th file page #99 of the first file File 1, and the write request and a logical address to at least some of the plurality of storage devices (for example, the i-th storage device 100-$i$, the (i+1)-th storage device 100-$i$+1, and the (i+2)-th storage device 100-$i$+2) in S10.

Then, at least some of the plurality of storage devices (for example, the i-th storage device 100-$i$, the (i+1)-th storage device 100-$i$+1, and the (i+2)-th storage device 100-$i$+2) compresses chunks including the 100th file page #100 of the first file File 1, the parity file P and the 99th file page #99 of the first file File 1, and updates the chunk mapping table TB22 in S20.

In this regard, for example, the zone management circuit 112 of the i-th storage device 100-$i$ (i is a positive integer) identifies whether a space in which a page is to be written is absent in the k-th zone zone_k (k is a positive integer) (in other words, the zone is closed) in S30.

When the zone management circuit 112 of the i-th storage device 100-$i$ (i is a positive integer) determines that the k-th zone zone_k (k is a positive integer) is closed (Y), the i-th storage device 100-$i$ (i is a positive integer) transmits the compressed chunk mapping table TB22 to the host 20 in S40.

Otherwise, when the zone management circuit 112 of the i-th storage device 100-$i$ (i is a positive integer) determines that the k-th zone zone_k (k is a positive integer) is not closed (N), the i-th storage device 100-$i$ (i is a positive integer) does not transmit the compressed chunk mapping table TB22 to the host 20 in S50.

Figure 7:
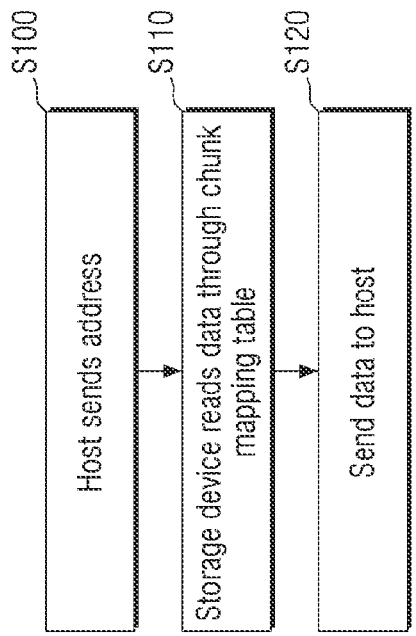
FIGS. 7 and 8 are flowcharts illustrating a read operation of a data processing system according to some embodiments.
Figure 8:
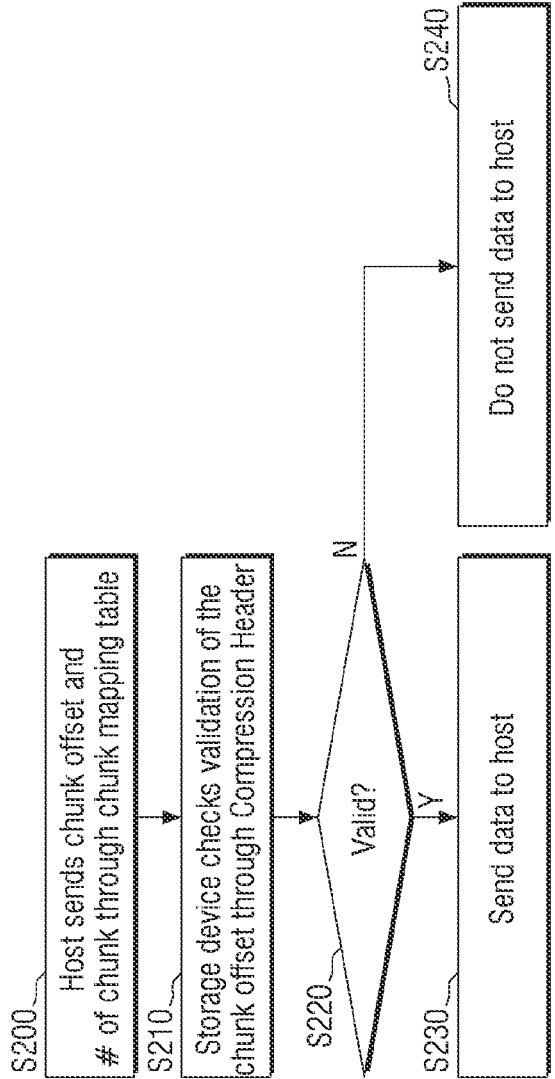

FIGS. 7 and 8 are flowcharts illustrating a read operation of a data processing system according to some embodiments.

Referring to FIGS. 1, 4, 5, and 7, a scheme in which when the host 20 does not have the chunk mapping table TB22, the data processing system 10 reads data, will be described.

The host 20 sends an address including a storage device index 100-#, a zone index zone #, a chunk index chunk #, and a page index P ## to the storage device in S100.

Thereafter, in response to the read request from the host 20, the storage device may convert a received logical address into a physical address based on the zone mapping table TB11 of FIG. 2$b$ and the chunk mapping table TB22 of FIG. 4. The storage device may perform the read operation using the physical address in S110.

Thereafter, the storage device transmits data extracted via the read operation to the host 20 in S120.

Referring to FIGS. 1, 4, 5, and 8, a scheme in which when the host 20 has the chunk mapping table TB22, the data processing system 10 reads data, will be described.

The host 20 transmits the chunk index # of Chunk and a corresponding chunk offset Off # to the storage device based on the chunk mapping table TB22 in S200.

Thereafter, the storage device checks whether the chunk offset corresponding to the chunk index received from the host 20 is valid, based on the compression header in S210.

In this regard, the storage device determines the validity of the chunk offset transmitted from the host 20, based on the compression header TB31 of FIG. 4. For example, the storage device determines integrity for the chunk offset based on a header checksum of the compression header TB31. Thereafter, the storage device identifies whether a zone index and a chunk number stored in the compression header TB31 correspond to the chunk offset delivered from the host 20, and whether a page corresponding to the chunk offset requested from the host 20 is included in the chunk number. When all of the above-described validity checking results are positive, the storage device determines that the chunk offset corresponding to the chunk index received from the host 20 is valid.

The validity thereof is determined in S220. When the chunk offset is valid (Y), the storage device transmits data requested from the host 20 to the host 20 in S230.

When the chunk offset is not valid (N), the storage device does not transmit data requested from the host 20 to the host 20 in S240.

Figure 9:
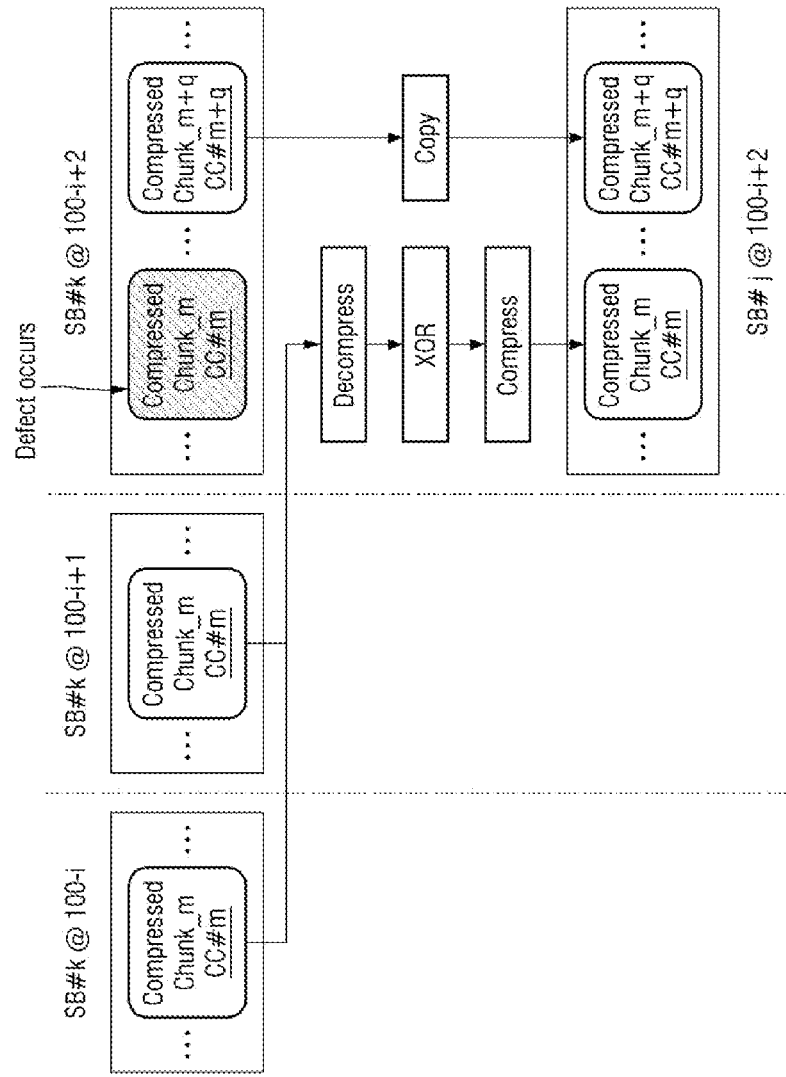
FIG. 9 is a flowchart illustrating a data recovery operation of a data processing system according to some embodiments.

FIG. 9 is a flowchart illustrating a data recovery operation of a data processing system according to some embodiments. FIG. 10 is a table illustrating a chunk mapping table that is updated via a data recovery operation of a data processing system according to some embodiments.

Referring to FIGS. 1, 9, and 10, when a media failure occurs during the read operation of the data processing system 10 according to some embodiments, the data processing system may recover the file page of the file system based on the chunks configured in the Redundant Arrays of Inexpensive Disks (RAID) using at least some among the plurality of storage devices 100-1 to 100-$n$.

For example, it is assumed that a defect has occurred in the k-th superblock SB #k of the (i+2)-th storage device 100-$i$+2. The system may designate, as a new superblock, another superblock of the (i+2)-th storage device 100-$i$+2 in which data is able to be written (for example, a j-th superblock SB #j) except for the k-th superblock SB #k of the (i+2)-th storage device 100-$i$+2, such that the superblock in which the defect occurred may be recovered. This will be described in further detail below.

The system may sequentially scan the compressed chunks in the (i+2)-th storage device 100-$i$+2 to identify the compressed chunk in which the defect has occurred. In this regard, a compressed chunk in which the defect does not occur (for example, an (m+q)-th compressed chunk CC #m+q) is directly copied to the j-th superblock SB #j. That is, a chunk offset of the (m+q)-th compressed chunk CC #m+q in the j-th superblock SB #j is the same as the chunk offset in the k-th superblock SB #k.

In this regard, when the compressed chunk in which the defect has occurred (e.g., an m-th compressed chunk CC #m) is detected, the m-th compressed chunk CC #m is received from another storage device in which the m-th compressed chunk CC #m in which the defect does not occur is written (for example, the i-th storage device 100-$i$, and the (i+1)-th storage device 100-$i$+1).

That is, the (i+2)-th storage device 100-$i$+2 receives the m-th compressed chunk CC #m from the i-th storage device 100-$i$, and the (i+1)-th storage device 100-$i$+1. This is because the plurality of storage devices 100-1 to 100-$n$ include the In Storage Compression (ICS) function so that the compressed chunk may be transmitted and received between the storage devices without decompression thereof.

Upon receiving the m-th compressed chunk CC #m from the i-th storage device 100-$i$ and the (i+1)-th storage device 100-$i$+1, the (i+2)-th storage device 100-$i$+2 decompresses the m-th compressed chunk CC #m received from the i-th storage device 100-$i$, and the (i+1)-th storage device 100-$i$+1.

Thereafter, an XOR operation is performed on the decompressed m-th chunk C #m.

Thereafter, a result value obtained by performing the XOR operation on the decompressed m-th chunk C #m is compressed to generate the compressed chunk CC #m.

The newly compressed chunk CC #m is stored in the j-th superblock SB #j.

Thereafter, the chunk mapping table TB22-2 may be updated in relation to the j-th superblock SB #j of the (i+2)-th storage device 100-$i$+2.

Figure 11A:
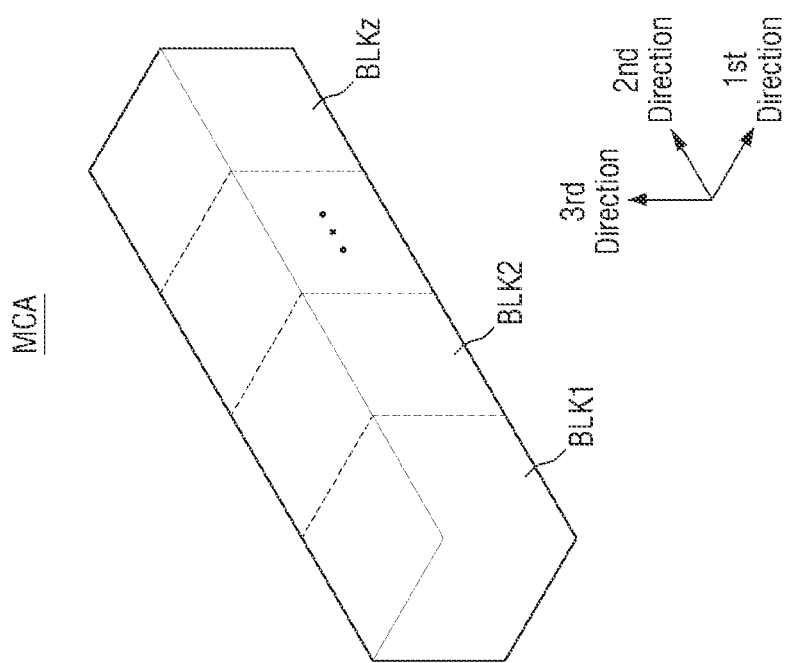
FIG. 11a is a block diagram showing a memory cell array of the memory device of FIG. 1.
Figure 11B:
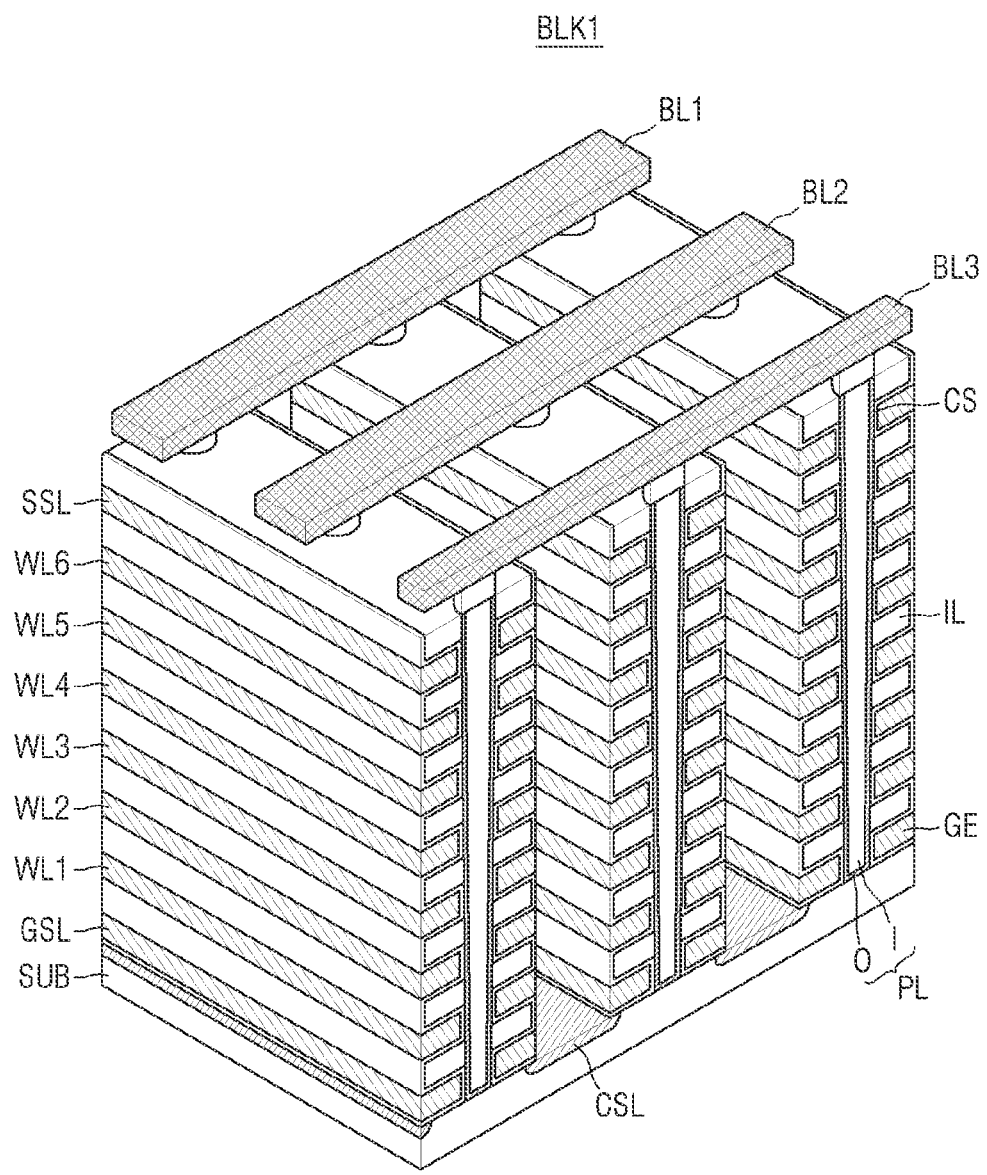
FIG. 11b is a diagram illustrating a configuration of one memory block among memory blocks of FIG. 11a, according to some embodiments.

FIG. 11$a$ is a block diagram showing a memory cell array of the memory device of FIG. 1, and FIG. 11$b$ is a diagram illustrating a configuration of one memory block among memory blocks of FIG. 11$a$, according to some embodiments.

Referring to FIG. 11$a$, a memory cell array MCA may include a plurality of memory blocks BLK1 to BLKz (z is a positive integer). Each of the memory blocks BLK1 to BLKz may have a three-dimensional structure (or a vertical structure). For example, each of the memory blocks BLK1 to BLKz may include structures extending along the first to third directions. Each of the memory blocks BLK1 to BLKz may include a plurality of cell strings extending along the second direction. The plurality of cell strings may be spaced apart from each other along each of the first and third directions. Cell strings of one memory block are connected to a plurality of bit-lines BL (see FIG. 11$b$, BL1 to BL3), a plurality of string select lines SSL (see FIG. 11$b$), a plurality of word-lines WL (see FIG. 11$b$, WL1 to WL6), one ground select line or a plurality of ground select lines GSL (see FIG. 11$b$), and a common source line (see FIG. 11$b$, CSL). Cell strings of the plurality of memory blocks BLK1 to BLKz may share the plurality of bit-lines BL with each other. For example, the plurality of bit-lines BL may extend along the second direction so as to be shared by the plurality of memory blocks BLK1 to BLKz.

Referring further to FIG. 11$b$, one memory block BLKn of the plurality of memory blocks BLK1 to BLKz of FIG. 11$a$ has a structure extending in a vertical direction with respect to a substrate SUB. The common source line CSL is disposed in the substrate SUB, while gate electrodes GE and insulation layers IL are alternately stacked on top of each other while being disposed on the substrate SUB. Further, a charge storage layer CS may be formed between the gate electrode GE and the insulating film IL.

A V-shaped pillar PL is formed by vertically patterning the plurality of gate electrodes GE and the insulating films IL alternately stacked on top of each other in the vertical direction. The pillar PL extends through the gate electrodes GE and the insulating films IL and is connected to the substrate SUB. An outer portion O of the pillar PL may be made of a semiconductor material and function as a channel, while an inner portion I thereof may be made of an insulating material such as, for example, silicon oxide.

The gate electrodes GE of the memory block BLKn may be connected to a ground select line GSL, a plurality of word-lines WL1 to WL6 and a string select line SSL, respectively. In addition, the pillar PL of the memory block BLKn may be connected to a plurality of bit-lines BL1 to BL3.

However, the memory block BLKn as shown in FIG. 11$b$ is merely one implementation provided for convenience of description, and the present disclosure is not limited thereto. For example, it will be fully understood that the technical idea of embodiments of the present disclosure may also be applied to various other implementations (such as a 2D memory structure) of the memory block BLKn.

Figure 12:
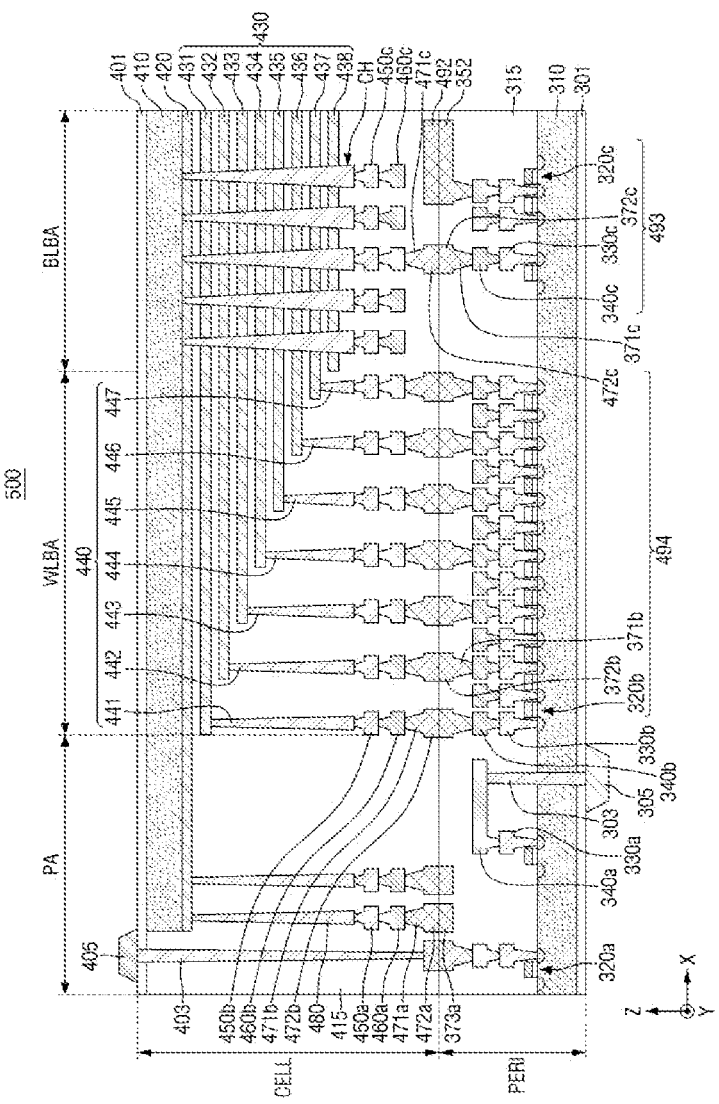
FIG. 12 is a diagram illustrating a chip-to-chip (C2C) structure applied to a memory device according to some embodiments.

FIG. 12 is a diagram illustrating a chip-to-chip (C2C) structure applied to a memory device according to some embodiments of the present disclosure. A memory device 500 is an example of the memory device 120 of FIG. 1.

Referring to FIG. 12, the memory device 500 may have a C2C structure. The C2C structure may be formed by manufacturing an upper chip including a first wafer and a cell area CELL on the first wafer, and then manufacturing a lower chip including a second wafer different from the first wafer and a peripheral circuit area PERI on the second wafer, and then coupling the upper chip and the lower chip to each other in a bonding scheme. In an example, the bonding scheme may mean a scheme in which a bonding metal such as the uppermost metal layer of the upper chip and a bonding metal such as the uppermost metal layer of the lower chip are electrically connected to each other. For example, when the bonding metal is made of copper (Cu), the bonding scheme may be a Cu—Cu bonding scheme. Alternatively, the bonding metal may be made of aluminum or tungsten.

Each of the peripheral circuit area PERI and the cell area CELL of the memory device 500 may include an outer pad bonding area PA, a word-line bonding area WLBA, and a bit-line bonding area BLBA.

The peripheral circuit area PERI may include a first substrate 310, an interlayer insulating layer 315, a plurality of circuit elements 320$a$, 320$b$, and 320$c$ formed on the first substrate 310, first metal layers 330$a$, 330$b$, and 330$c$ respectively connected to the plurality of circuit elements 320$a$, 320$b$, 320$c$, and second metal layers 340$a$, 340$b$, and 340$c$ formed on the first metal layers 330$a$, 330$b$, and 330$c$. In some embodiments, each of the first metal layers 330$a$, 330$b$, and 330$c$ may be made of tungsten having a relatively high resistance, and each of the second metal layers 340$a$, 340$b$, and 340$c$ may be made of copper having a relatively low resistance.

In FIG. 12, an embodiment illustrating only the first metal layers 330a, 330b, 330c and the second metal layers 340a, 340b, and 340c is illustrated. However, the present disclosure is not limited thereto. For example, according to some embodiments, at least one metal layer may be further formed on the second metal layers 340a, 340b, and 340c. At least some of the one or more metal layers formed on the second metal layers 340a, 340b, and 340c may be made of, for example, aluminum having a lower resistance than that of copper constituting the second metal layers 340a, 340b, and 340c.

The interlayer insulating layer 315 may be disposed on the first substrate 310 so as to cover the plurality of circuit elements 320a, 320b, and 320c, the first metal layers 330a, 330b, and 330c, and the second metal layer 340a, 340b, and 340c, and may be made of an insulating material such as, for example, silicon oxide, silicon nitride, or etc.

Lower bonding metals 371b and 372b may be formed on the second metal layer 340b and in the word-line bonding area WLBA. In the word-line bonding area WLBA, the lower bonding metal 371b and 372b of the peripheral circuit area PERI may be electrically connected to upper bonding metal 471b and 472b of the cell area CELL in a bonding manner. Each of the lower bonding metal 371b and 372b and the upper bonding metals 471b and 472b may be made of, for example, aluminum, copper, or tungsten.

The cell area CELL may provide at least one memory block. The cell area CELL may include a second substrate 410 and a common source line 420. A plurality of word-lines 431 to 438, collectively referred to as 430, may be stacked on top of each other along a direction (Z-axis direction) perpendicular to a top face of the second substrate 410 while being disposed on the second substrate 410. String select lines and a ground select line may be disposed above and below the stack of the word-lines 430, respectively. Thus, the plurality of word-lines 430 may be disposed between the string select lines and the ground select line.

In the bit-line bonding area BLBA, a channel structure CH may extend in a direction perpendicular to the top face of the second substrate 410 so as to extend through the word-lines 430, the string select lines, and the ground select line. The channel structure CH may include a data storage layer, a channel layer, and a buried insulating layer. The channel layer may be electrically connected to a first metal layer 450c and a second metal layer 460c. For example, the first metal layer 450c may act as a bit-line contact, and the second metal layer 460c may act as a bit-line. Thus, 460c may refer to a bit-line. In an embodiment, the bit-line 460c may extend along a first direction (Y-axis direction) parallel to the top face of the second substrate 410.

In some embodiments, as shown in FIG. 12, an area in which a channel structure CH and the bit-line 460c are disposed may be defined as the bit-line bonding area BLBA. The bit-line 460c may be electrically connected to the circuit elements 320c constituting a page buffer 493 in the peripheral circuit area PERI and in the bit-line bonding area BLBA. In an example, the bit-line 460c may be connected to upper bonding metals 471c and 472c in the cell area CELL. The upper bonding metals 471c and 472c may be connected to lower bonding metal 371c and 372c connected to the circuit elements 320c of the page buffer 493.

In the word-line bonding area WLBA, the word-lines 430 may extend along a second direction (X-axis direction) parallel to the top face of the second substrate 410, and may be connected to a plurality of cell contact plugs 441 to 447, collectively referred to as 440. The word-lines 630 and the cell contact plugs 640 may be respectively connected to each other via pads as extensions having different lengths of at least some of the word-lines 630 along the second direction. A first metal layer 450b may be connected to a top of each of the cell contact plugs 440 connected to the word-lines 630. A second metal layer 460b may be connected to a top of the first metal layer 450b. The cell contact plugs 440 may be connected to the peripheral circuit area PERI via the upper bonding metals 471b and 472b of the cell area CELL and the lower bonding metals 371b and 372b of the peripheral circuit area PERI in the word-line bonding area WLBA.

The cell contact plugs 440 may be electrically connected to circuit elements 320b constituting a row decoder 494 in the peripheral circuit area PERI. In some embodiments, an operation voltage of the circuit elements 320b constituting the row decoder 494 may be different from an operation voltage of the circuit elements 320c constituting the page buffer 493. In an example, the operation voltage of the circuit elements 320c constituting the page buffer 493 may be greater than the operation voltage of the circuit elements 320b constituting the row decoder 494.

A common source line contact plug 480 may be disposed in the outer pad bonding area PA. The common source line contact plug 480 may be made of a conductive material such as, for example, a metal, a metal compound, or polysilicon, and may be electrically connected to the common source line 420. A first metal layer 450a may be connected to a top of the common source line contact plug 480. A second metal layer 460a may be connected to a top of the first metal layer 450a. In an example, an area in which the common source line contact plug 480, the first metal layer 450a, and the second metal layer 460a are disposed may be defined as the outer pad bonding area PA.

Further, input/output pads 305 and 405 may be disposed in the outer pad bonding area PA. A lower insulating film 301 covering a bottom face of the first substrate 310 may be formed under the first substrate 310, and the first input/output pad 305 may be formed on the lower insulating film 301. A first input/output pad 305 may be connected to at least one of the plurality of circuit elements 320a, 320b, and 320c disposed in the peripheral circuit area PERI via a first input/output contact plug 303, and may be isolated from the first substrate 310 via the lower insulating film 301. Further, a side insulating film may be disposed between the first input/output contact plug 303 and the first substrate 310 so as to electrically isolate the first input/output contact plug 303 and the first substrate 310 from each other.

An upper insulating film 401 covering a top face of the second substrate 410 may be formed on the second substrate 410, and a second input/output pad 405 may be disposed on the upper insulating film 401. The second input/output pad 405 may be connected to at least one of the plurality of circuit elements 320a, 320b, and 320c disposed in the peripheral circuit area PERI via a second input/output contact plug 403.

According to some embodiments, the second substrate 410 and the common source line 420 are not disposed in an area where the second input/output contact plug 403 is disposed. Further, according to some embodiments, the second input/output pad 405 does not overlap the word-lines 430 in the third direction (Z-axis direction). The second input/output contact plug 403 may be isolated from the second substrate 410 in a direction parallel to the top face of the second substrate 410, may extend through an interlayer insulating layer 415 of the cell area CELL, and thus, may be connected to the second input/output pad 405.

According to some embodiments, the first input/output pad 305 and the second input/output pad 405 may be selectively formed. In an example, the memory device 500 may include only the first input/output pad 305 disposed on the first substrate 310, or include only the second input/output pad 405 disposed on the second substrate 410. Alternatively, the memory device 500 may include both the first input/output pad 305 and the second input/output pad 405.

In each of the outer pad bonding area PA and the bit-line bonding area BLBA included in each of the cell area CELL and the peripheral circuit area PERI, a metal pattern as the topmost metal layer may be a dummy pattern, or the topmost face metal layer may be absent.

In the outer pad bonding area PA of the memory device 500, an upper metal pattern 472*a* may be formed as the topmost metal layer of the cell area CELL, while a lower metal pattern 373*a* having the same form as that of the upper metal pattern 472*a* of the cell area CELL may be formed as the topmost metal layer of the peripheral circuit area PERI in a corresponding manner to the upper metal pattern 472*a*. In some embodiments, The lower metal pattern 373*a* formed as the topmost metal layer of the peripheral circuit area PERI is not connected to a separate contact in the peripheral circuit area PERI. Similarly, in the outer pad bonding area PA, an upper metal pattern having the same form as that of the lower metal pattern of the peripheral circuit area PERI formed as the topmost metal layer of the peripheral circuit area PERI may be formed as an upper metal layer of the cell area CELL in a corresponding manner to the lower metal pattern of the peripheral circuit area PERI formed as the topmost metal layer of the peripheral circuit area PERI.

The lower bonding metals 371*b* and 372*b* may be formed on a second metal layer 440*b* in the word-line bonding area WLBA. In the word-line bonding area WLBA, the lower bonding metals 371*b* and 372*b* of the peripheral circuit area PERI may be electrically connected to the upper bonding metals 471*b* and 472*b* of the cell area CELL in a bonding manner.

Further, in the bit-line bonding area BLBA, an upper metal pattern 492 having the same form as that of a lower metal pattern 352 formed as the topmost metal layer of the peripheral circuit area PERI may be formed as the topmost metal layer of the cell area CELL in a corresponding manner to the lower metal pattern 352 formed as the topmost metal layer of the peripheral circuit area PERI. In some embodiments, a contact is not formed on the upper metal pattern 492 formed as the topmost metal layer of the cell area CELL.

Figure 13:
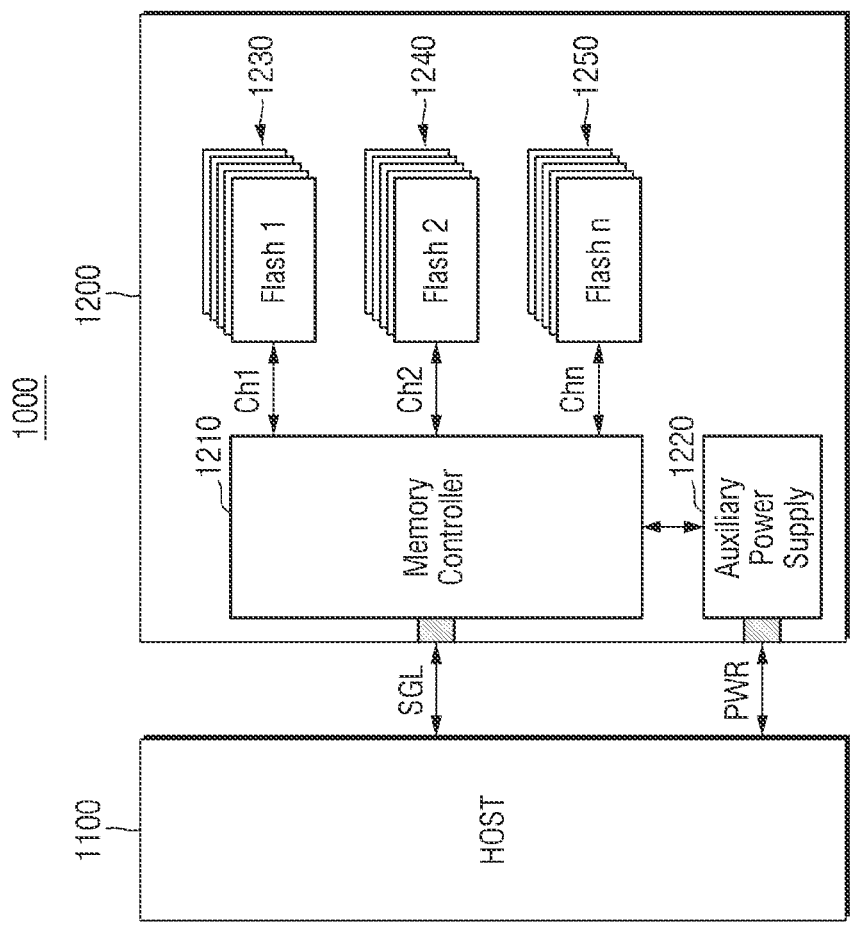
FIG. 13 is a block diagram illustrating a solid state drive (SSD) system according to some embodiments.

FIG. 13 is a block diagram illustrating a solid state drive (SSD) system according to some embodiments of the present disclosure.

Referring to FIG. 13, an SSD system 1000 may include a host 1100 and an SSD 1200. The SSD system 1000 may be an implementation example of the data processing system 10 as described above with reference to FIG. 1.

The SSD 1200 may send and receive a signal SGL to and from the host 1100 via a signal connector, and may receive power PWR therefrom via a power connector. The SSD 1200 may include a memory controller 1210, an auxiliary power supply 1220, and a plurality of memory devices 1230, 1240, and 1250 (e.g., Flash 1, Flash 2, and Flash n, where n is a positive integer).

In some embodiments, the memory controller 1210 may be connected to the plurality of memory devices 1230, 1240, and 1250 via channels Ch1, Ch2, and Chn (where n is a positive integer), respectively so as to perform a zone management operation according to some embodiments of the present disclosure. For example, the memory controller 1210 may divide data received from the host 1100 into chunks and may compress the chunks and may write the compressed chunks to the plurality of memory devices 1230, 1240, and 1250, and generate offsets of the compressed chunks. In an example, the memory controller 1210 may directly manage the offsets of the compressed chunks based on a compressed chunk mapping table. In an example, the memory controller 1210 may provide the offsets of the compressed chunks to the host 1100, and then the host 1100 may directly manage the offsets of the compressed chunks.

Further, the memory controller 1210 may periodically or aperiodically notify the host 1100 of available capacities of superblocks additionally obtained as the chunks are compressed and then written, thereby inducing an efficient write operation request of the host 1100. In some embodiments, manners in which the memory controller 1210 performs the zone managements on the memory devices 1230, 1240, and 1250, respectively may be different from each other.

Figure 14:
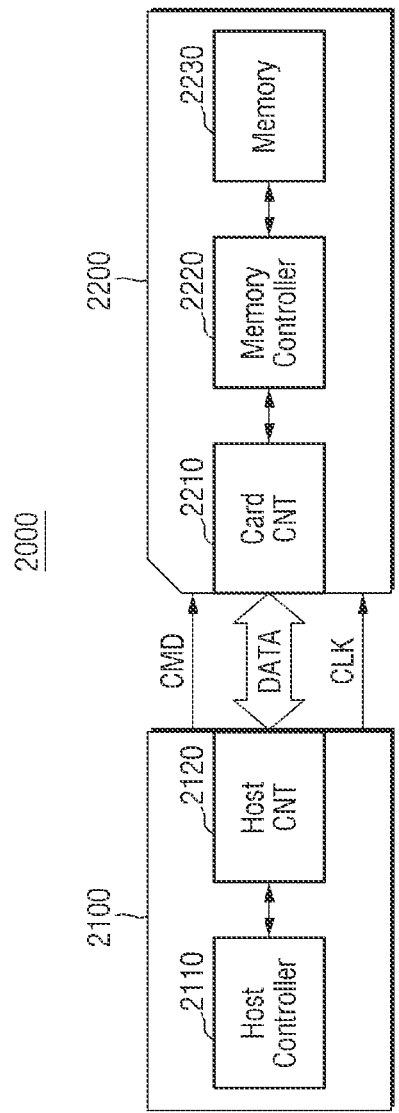
FIG. 14 is a block diagram showing an example in which a memory system according to some embodiments is applied to a memory card system.

FIG. 14 is a block diagram showing an example in which a memory system according to some embodiments of the present disclosure is applied to a memory card system.

Referring to FIG. 14, a memory card system 2000 may include a host 2100 and a memory card 2200. The memory card system 2000 may be an implementation example of the data processing system 10 as described above with reference to FIG. 1.

The host 2100 may include a host controller 2110 and a host connector 2120. The memory card 2200 may include a card connector 2210, a memory controller 2220 and a memory device 2230.

The host 2100 may write data to the memory card 2200 or read data written to the memory card 2200 therefrom. The host controller 2110 may transmit a command CMD, a clock signal CLK generated by a clock generator of the host 2100, and data DATA to the memory card 2200 via the host connector 2120. The memory card 2200 may provide the zoned name space interface according to some embodiments of the present disclosure to the host 2100.

For example, the memory card 2200 may divide the data DATA received from the host 2100 into chunks, and may compress the chunks and may write the compressed chunks to the memory device 2230, and may generate offsets of the compressed chunks. In an example, the memory controller 2220 may directly manage the offsets of the compressed chunks, based on a compressed chunk mapping table. In an example, the memory controller 2220 may provide the offsets of the compressed chunks to the host 2100, and then the host 2100 may directly manage the offsets of the compressed chunks.

Further, the memory card 2200 may periodically or apperiodically notify the host 2100 of available capacities of superblocks additionally obtained as the chunks are compressed and then written, thereby inducing an efficient write operation request of the host 2100.

In response to the command received via the card connector 2210, the memory controller 2220 may store the data in the memory device 2230 in synchronization with the clock signal generated by the clock generator of the memory controller 2220.

The memory card 2200 may be implemented as, for example, a compact flash card (CFC), a microdrive, a smart media card (SMC), a multimedia card (MMC), a security digital card (SDC), a memory stick, a USB flash memory driver, or the like.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A data processing system, comprising:
   a host including a host memory configured to store a plurality of file systems, wherein each file system includes a plurality of file pages; and
   a plurality of storage devices, wherein each of the storage devices includes:
      a memory device including a plurality of memory blocks; and
      a memory controller configured to divide the plurality of memory blocks into a plurality of superblocks, and control a memory operation of the memory device based on a result of dividing the plurality of memory blocks,
   wherein the host requests a first storage device of the plurality of storage devices to write a first file page of a first file system of the plurality of file systems to a first memory block of the first storage device, and
   the host requests a second storage device of the plurality of storage devices to write a second file page of the first file system of the plurality of file systems to a first memory block of the second storage device,
   wherein the first file system is configured in a Redundant Arrays of Inexpensive Disks (RAID) manner using at least some of the plurality of storage devices,
   wherein the memory controller of the first storage device is configured to:
   write a first compressed chunk generated by compressing a first chunk to a first superblock of the first storage device,
   wherein the first chunk includes data which the host requests the first storage device to write,
   wherein the first superblock of the first storage device is selected from among the plurality of superblocks of the first storage device, based on a first logical address of the first storage device received from the host, and
   generate a position-related offset of the first compressed chunk in the first superblock of the first storage device.

2. The data processing system of claim 1,
   wherein the memory controller of the second storage device is configured to:
      write a second compressed chunk generated by compressing a second chunk to a first superblock of the second storage device,
      wherein the second chunk includes data which the host requests the second storage device to write,
      wherein the first superblock of the second storage device is selected from among the plurality of superblocks of the second storage device, based on a first logical address of the second storage device received from the host, and
      generate a position-related offset of the second compressed chunk in the first superblock of the second storage device.

3. The data processing system of claim 2, wherein the position-related offset of the first compressed chunk in the first superblock of the first storage device generated by the memory controller of the first storage device is recorded in a chunk mapping table of the first storage device,
   wherein the position-related offset of the second compressed chunk in the first superblock of the second storage device generated by the memory controller of the second storage device is recorded in a chunk mapping table of the second storage device.

4. The data processing system of claim 3, wherein when the first superblock of the first storage device is closed, the memory controller of the first storage device is configured to transmit the chunk mapping table of the first storage device to the host.

5. The data processing system of claim 4, wherein the chunk mapping table of the first storage device is stored in the host memory.

6. The data processing system of claim 1, wherein the host is configured to request a third storage device of the plurality of storage devices to write parity data to a first memory block of the third storage device,
   wherein the parity data is generated by XORing the first file page of the first file system and the second file page of the first file system.

7. The data processing system of claim 1, wherein the host is configured to request a third storage device of the plurality of storage devices to write a third file page of the first file system of the plurality of file systems to a first memory block of the third storage device,
   wherein the memory controller of the third storage device is configured to:
      write a first compressed chunk generated by compressing a first chunk to a first superblock of the third storage device,
      wherein the first chunk includes data which the host requests the third storage device to write,
      wherein the first superblock is selected from among the plurality of superblocks of the third storage device, based on a first logical address of the third storage device received from the host, and
      generate a position-related offset of the first compressed chunk in the first superblock of the third storage device.

8. The data processing system of claim 7, wherein when a defect occurs in the first compressed chunk written to the first superblock of the third storage device,
   the memory controller of the third storage device is configured to:
      receive a compressed chunk stored in the first storage device from the first storage device, and a compressed chunk stored in the second storage device from the second storage device,
      decompress the compressed chunk received from the first storage device and the compressed chunk received from the second storage device,
      perform an XOR operation on the decompressed chunk received from the first storage device and the decompressed chunk received from the second storage device to generate an XOR operation result,
      re-compress the XOR operation result, and
      write the re-compressed XOR operation result to a second superblock different from the first superblock of the third storage device.

9. The data processing system of claim 8, wherein a second compressed chunk among a plurality of compressed chunks written to the first superblock of the third storage device is not defective and is copied to the second superblock of the third storage device.

10. A data processing system, comprising:
   a host including a host memory configured to store a plurality of file systems, wherein each file system includes a plurality of file pages; and
   a plurality of storage devices, wherein each of the storage devices includes:
      a memory device including a plurality of memory blocks; and a memory controller configured to divide the plurality of memory blocks into a plurality of superblocks, and control a memory operation of the memory device based on a result of dividing the plurality of memory blocks, wherein a first file page of a first file system of the plurality of file systems is written to a first memory block of a first storage device of the plurality of storage devices, a second file page of the first file system of the plurality of file systems is written to a first memory block of a second storage device of the plurality of storage devices, wherein the first file system is configured in a Redundant Arrays of Inexpensive Disks (RAID) manner using at least some of the plurality of storage devices, wherein when the host reads the first file page, the host requests a logical address of the first memory block from the first storage device, receives the logical address from the first storage device, and reads the first file page based on the received logical address.

11. The data processing system of claim 10, wherein the memory controller of the first storage device is configured to:

write a first compressed chunk generated by compressing a first chunk to a first superblock of the first storage device, wherein the first chunk includes data which the host requests the first storage device to write, wherein the first superblock of the first storage device is selected from among the plurality of superblocks of the first storage device, based on a first logical address of the first storage device received from the host, and generate a position-related offset of the first compressed chunk in the first superblock of the first storage device, wherein the memory controller of the second storage device is configured to:

write a second compressed chunk generated by compressing a second chunk to a first superblock of the second storage device, wherein the second chunk includes data which the host requests the second storage device to write, wherein the first superblock of the second storage device is selected from among the plurality of superblocks of the second storage device, based on a first logical address of the second storage device received from the host, and generate a position-related offset of the second compressed chunk in the first superblock of the second storage device.

12. The data processing system of claim 11, wherein the position-related offset of the first compressed chunk in the first superblock of the first storage device generated by the memory controller of the first storage device is recorded in a chunk mapping table of the first storage device, wherein the position-related offset of the second compressed chunk in the first superblock of the second storage device generated by the memory controller of the second storage device is recorded in a chunk mapping table of the second storage device.

13. The data processing system of claim 12, wherein when the first superblock of the first storage device is closed, the memory controller of the first storage device is configured to transmit the chunk mapping table of the first storage device to the host.

14. The data processing system of claim 13, wherein the chunk mapping table of the first storage device is stored in the host memory.

15. The data processing system of claim 13, wherein the host is configured to request the first storage device to read the first file page, based on the chunk mapping table of the first storage device.

16. The data processing system of claim 10, wherein the host is configured to request a third storage device of the plurality of storage devices to write a third file page of the first file system of the plurality of file systems to a first memory block of the third storage device, wherein the memory controller of the third storage device is configured to:

write a first compressed chunk generated by compressing a first chunk to a first superblock of the third storage device, wherein the first chunk includes data which the host requests the third storage device to write, wherein the first superblock is selected from among the plurality of superblocks of the third storage device, based on a first logical address of the third storage device received from the host, and generate a position-related offset of the first compressed chunk in the first superblock of the third storage device.

17. The data processing system of claim 16, wherein when a defect occurs in the first compressed chunk written to the first superblock of the third storage device, the memory controller of the third storage device is configured to:

receive a compressed chunk stored in the first storage device from the first storage device, and a compressed chunk stored in the second storage device from the second storage device, decompress the compressed chunk received from the first storage device and the compressed chunk received from the second storage device, perform an XOR operation on the decompressed chunk received from the first storage device and the decompressed chunk received from the second storage device to generate an XOR operation result, re-compress the XOR operation result, and write the re-compressed XOR operation result to a second superblock different from the first superblock of the third storage device.

18. The data processing system of claim 17, wherein a second compressed chunk among a plurality of compressed chunks written to the first superblock of the third storage device is not defective and is copied to the second superblock of the third storage device.

19. A data processing system, comprising:

a host including a host memory configured to store a plurality of file systems, wherein each file system includes a plurality of file pages; and a plurality of storage devices, wherein each of the storage devices includes:

a memory device including a plurality of memory blocks; and a memory controller configured to;

divide the plurality of memory blocks into a plurality of superblocks, and control a memory operation of the memory device based on a result of dividing the plurality of memory blocks;

compress a first chunk into a first compressed chunk and write the first compressed chunk to a first superblock of the corresponding storage device, wherein the first chunk includes data which the host requests the corresponding storage device to write, wherein the first superblock is selected from among the plurality of superblocks of the corresponding storage device, based on a first logical address of the corresponding storage device received from the host; and generate a position-related offset of the first compressed chunk in the first superblock of the corresponding storage device, wherein each of the plurality of storage devices is configured to receive compressed data stored in another storage device of the plurality of storage devices, and to decompress the received compressed data.

20. The data processing system of claim 19, wherein the host is configured to write the plurality of file pages constituting a first file system of the plurality of file systems to at least some of the plurality of storage devices, wherein the first file system is configured in a Redundant Arrays of Inexpensive Disks (RAID) manner using the at least some of the plurality of storage devices.

* * * * *